United States Patent [19]

Clyde

[11] Patent Number: 4,701,848

[45] Date of Patent: Oct. 20, 1987

[54] SYSTEM FOR EFFECTIVELY PARALLELING COMPUTER TERMINAL DEVICES

[75] Inventor: Robert A. Clyde, Orem, Utah

[73] Assignee: Clyde, Inc., Orem, Utah

[21] Appl. No.: 673,128

[22] Filed: Nov. 19, 1984

[51] Int. Cl.[4] .......................... G06F 9/00; G06F 11/00
[52] U.S. Cl. ..................................... 364/300; 364/900
[58] Field of Search ... 364/200 MS File, 900 MS File, 364/300; 371/16, 17, 18

[56] References Cited

U.S. PATENT DOCUMENTS

| | | | |
|---|---|---|---|
| 3,539,998 | 7/1967 | Belcher et al. | 364/200 |
| 3,701,971 | 10/1972 | Scanner et al. | 364/200 |
| 4,034,346 | 7/1977 | Hostein | 364/200 |
| 4,034,351 | 7/1977 | Takezoe | 364/900 |
| 4,057,847 | 11/1977 | Lowell et al. | 364/200 |
| 4,125,892 | 11/1978 | Fukuda et al. | 364/200 |
| 4,649,479 | 3/1987 | Advani et al. | 364/300 |

OTHER PUBLICATIONS

IBM Tech. Discl. Bull., vol 20, No. 6, "Device Independent Printer Attachment" by R. W. Callahan, Nov. 1977, pp. 2187–2188.

*Primary Examiner*—Raulfe B. Zache
*Assistant Examiner*—William G. Niessen
*Attorney, Agent, or Firm*—Workman, Nydegger & Jensen

[57] ABSTRACT

In a digital computing system such as the Digital Equipment Corporation's VAX computer system which uses the VMS operating system in which terminal devices are connected to the system through terminal dependent device drivers coupled to terminal independent device drivers so that the operating system of the computer system need not be modified each time a terminal device is added or subtracted, a system and method is provided for effectively paralleling an auxiliary terminal with a selected terminal of the system so that the selected terminal can be monitored for instruction, security, audit, or other purposes, by creating a user controlling driver and a user controlling device coupled thereto, and coupling the user controlling driver and user controlling device combination between the terminal independent device driver and the terminal dependent device driver associated with the terminal device to be paralleled so that the output of the terminal independent device driver intended for the terminal dependent device driver passes through the user controlling driver and user controlling device before arriving at the terminal dependent device driver and the output of the terminal dependent device driver intended for the terminal independent device driver passes through the user controlling driver and user controlling device before arriving at the terminal independent device driver and making the information passing through the user controlling driver available to the auxiliary terminal device.

50 Claims, 8 Drawing Figures

SYSTEM FOR EFFECTIVELY PARALLELING COMPUTER TERMINAL DEVICES

BACKGROUND OF THE INVENTION

1. Field

The invention is in the field of methods and devices to enable the linking of a computer terminal device to one or more additional terminal devices so that each of the linked devices effectively operate in parallel to receive information from the computer or to input information into the computer.

2. State of the Art

Some computer systems are configured to allow several terminal devices to be connected effectively in parallel so that each of the paralled terminal devices receive identical information from the computer or each can supply information to the computer and to each other. For example if two CRT input/output terminals are connected in parallel in such a system, any information from the computer will be displayed on both paralleled terminals. Also, in most instances either may be used to enter data or instructions into the computer and the entered data or instructions on one terminal will show on the other paralleled terminal.

Most computer systems today are designed to be connected to many terminal devices, such as many CRT displays, with each terminal device operating independently of the other terminal devices. In fact, most systems are designed specifically to prevent terminal divices from being paralleled so that a person on one terminal cannot spy on another terminal and cannot interfere with the operation of such other terminal. With such systems, it is possible to electrically connect two or more terminals together in parallel, but once such electrical connection is made, the terminals are always connected in parallel. Further, unless an elaborate mechanical switching arrangement is used, a particular terminal cannot be easily paralleled to a desired one of a plurality of terminals. Such a switching system is completely impractical where terminals are located at physically separated locations such as in different parts of a city or country.

In many instances it may be desirable to effectively parallel two terminal devices on a selectable basis. For example, if an operator is having a problem with a particular program or particular operations in a program, rather than having a person more knowledgeable in operation of that program or a special program troubleshooter or instructor physically travel to the operator's terminal, or orally describe, such as by telephone, the problem and solution, that person could merely connect his terminal in parallel to the operator's terminal, find the problem, and show the operator the correct procedure. Another example where selectable parallel connection might be desireable is where a supervisor or other official may wish to observe for security reasons what a particular operator is doing. With a parallel connection, the actions of the operator could be monitored unknown to the operator. In such instance, it is not necessary that the effective parallel connection provide for input from the auxiliary terminal, but merely for the providing of the same information flow between the CPU and monitored terminal to the auxiliary terminal. Further, rather than actually observing the operator, it may be desired to actually record and make a record or audit trail of an operator's actions to check at a later time, if necessary.

One computer system in wide use today is the VAX Computer system manufactured by Digital Equipment Corporation (DEC). This system uses what DEC calls the VMS operating system. Such system is different than most systems in use today in that rather than having the drivers for each terminal device a fixed portion of the operating system of the computer so that such operating system must be modified each time a terminal device is added or subtracted from the system, the VMS operating system provides a generalized or terminal independent device driver which is connected through specific or terminal dependent device drivers to specific terminal devices. Thus, it is not necessary to modify the operating system when terminal devices are added or subtracted, but to merely connect the terminal device to an appropriate specific terminal dependent device driver.

There is currently no known way to effectively and easily provide selected parallel operation of two or more terminal devices with such an operating system.

SUMMARY OF THE INVENTION

According to the invention, a system of effectively connecting an auxiliary terminal device in parallel with a selected terminal device comprises a user controlling driver (UC Driver) and a user controlling device (UC Device) coupled together and coupled between the terminal independent device driver and the terminal dependent device driver associated with the terminal device to be paralleled so that the output of the terminal independent device driver intended for the terminal dependent device driver and a specific terminal device passes through the UC Driver and UC Device before arriving at the terminal dependent device driver and the output of the terminal dependent device driver from a specific terminal device and intended for the terminal device independent driver passes through the UC Driver and UC Device before arriving at the terminal independent device driver. In this way, all information passing to or from a particular terminal device passes through the UC Driver which stores such information and makes it available to the auxiliary terminal device.

The auxiliary terminal device can merely monitor the information either storing it, displaying it, or printing it, or can interact with the paralleled terminal so that information can be inputed to the computer at either terminal device. Thus, the auxiliary terminal device could be a CRT, hard copy device, or secondary storage device such as for example, magnetic disc, magnetic tape, or laser disc.

THE DRAWINGS

In the accompanying drawings, which illustrate an embodiment of the invention constituting the best mode presently contemplated for carrying out the invention in actual practice:

FIG. 1 is a block diagram showing the terminal device driving system in the existing Digital Equipment Corporation VMS operating system and represents the prior art environment for the invention;

FIG. 2, a block diagram showing a portion of prior art environment of FIG. 1, with additional blocks as created by the invention, but not connected into the blocks shown from FIG. 1;

FIG. 3, a block diagram showing the combination of the additional blocks of the invention interconnected with the blocks of the existing environment.

FIG. 4, a block diagram showing additional blocks necessary to make use of the monitored terminal information and shows the program and information links for getting monitored data from the UC Device and UC Driver of FIG. 3 into a temporary buffer;

FIG. 5, a block diagram showing additional blocks necessary to transfer the information from the temporary buffer as obtained in the system of FIG. 4 to any auxiliary terminal device, FIGS. 4 and 5 together showing transfer of the monitored data to the auxiliary terminal;

FIG. 6, a block diagram showing an alternate arrangement to perform the same function as performed by combined FIGS. 4 and 5, to get the monitored data to an auxiliary terminal device;

FIG. 7, a block diagram similar to FIG. 5, showing the program and information links required to transfer information from an auxiliary terminal device to a temporary buffer; and FIG. 8, a block diagram similar to FIG. 4, showing the program and information links required to transfer information from the temporary buffer to the UC Driver and UC Device, FIGS. 7 and 8 together showing forcing of data from an auxiliary terminal to the CPU and monitored terminal.

DETAILED DESCRIPTION OF THE ILLUSTRATED EMBODIMENT

Although the invention may be used with any computer system using an operating system having independent device drivers and dependent device drivers for driving terminal devices, the invention will be described with particular reference to Digital Equipment Corporation's VMS operating system. Device drivers are explained in detail in the *VAX/VMS Guide to Writing a Device Driver* published by Digital Equipment Corporation.

Figure 1:
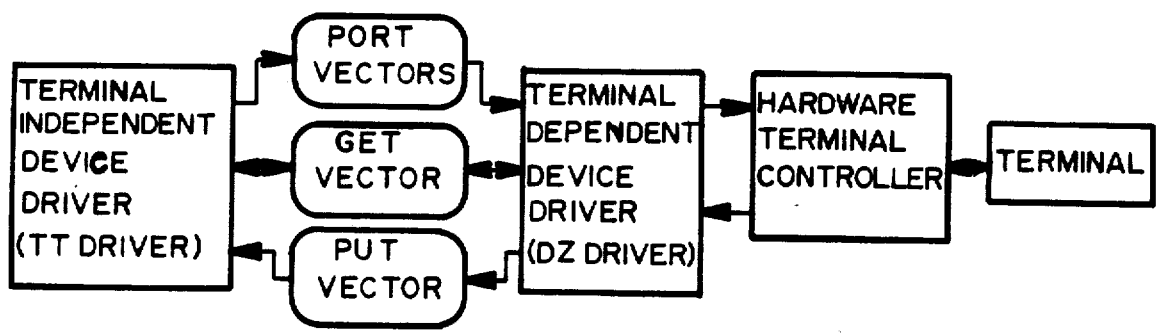

As shown by FIG. 1, the standard Digital Equipment Corporation's (DEC's) VMS operating system is arranged with at least one terminal independent device driver, one such driver called TT Driver by DEC, which receives information from the central processing (CPU) unit of the system intended for a specific terminal device and receives information from specific terminal devices intended for the CPU. The terminal independent device driver is designed to be substantially terminal independent meaning that the information is directed to or from a particular terminal regardless of the particular physical, electrical, and software requirements of the terminal. The terminal independent driver contains all of the basic routines which all programs call through VMS for doing terminal input and output. The present VMS systems utilize a single independent device driver to drive all terminal dependent device drivers and all terminal devices.

Since the terminal independent device driver is substantially terminal device independent, in order to provide input or accept output from a particular terminal, such driver must work through a terminal dependent device driver. This is a driver which takes the information from the terminal independent device driver and puts it in a form necessary to operate the hardware terminal controller which actually operates the terminal itself. The terminal dependent device drivers are of various types dependent upon the particular hardware terminal devices to be operated by the driver. IN DEC terminology such dependent device drivers may be, for example DZ Drivers, YC Drivers, or Console Drivers. Thus, if the hardware terminal controller to be operated is a DEC DZ-11 or DZ-32, the terminal dependent device driver is the DZ Driver. If the controller is a DMF-32, the terminal dependent device driver is the YC Driver. Other controllers will require other dependent device drivers. Here again, in DEC systems, one controller can control a number of actual terminals, and if all controllers used are of a single type, a single terminal dependent device driver may be used to drive all terminal controllers and all terminal devices. The terminal dependent device driver contains the routines necessary for actually placing output in a hardware register, getting input from a hardware register, handling interrupts, and handling other hardware dependent tasks.

Figure 2:
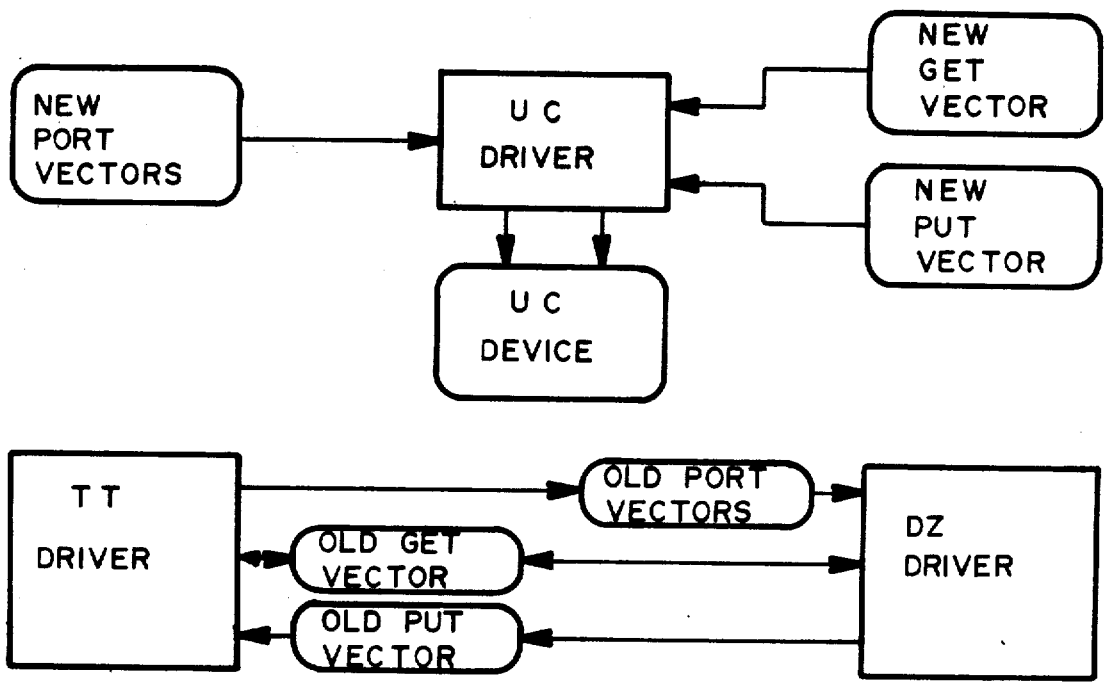

As indicated above, a computer system may include many hardware terminal devices, such as CRT input/output terminals, printers, readers, or data storage devices, yet have a single hardware terminal controller, a single terminal dependent device driver and a single terminal independent device driver. In such instance, each actual terminal device has its own identifying data and any information from the CPU directed to a particular terminal device will also contain the identifying data for the terminal device to which it is directed. With the DEC VMS system, when the information directed to a particular terminal device reaches the terminal independent device driver, such driver looks up the identifying data by which the terminal dependent device driver identifies the terminal which has been identified by the CPU. The identifying data for the terminal dependent device driver is known in VMS as the Port Vectors and terminal Unit Control Block (UCB). These Port Vectors identify to the terminal independent device driver the corresponding terminal dependent device driver. The terminal UCB identifies the exact hardware terminal device to which the information from the CPU is to be directed. Thus, FIGS. 1 and 2 show the terminal independent device driver connected through the Port Vectors to the terminal dependent device driver indicating that information for a particular terminal device, passes by reason of the Port Vectors from the terminal independent device driver to the terminal dependent device driver. The information then passes directly to the hardware terminal controller and the terminal. The address of the terminal UCB is always kept in a known general register so that it is available to any terminal device driver. Since the address of the UCB is always known and thus the UCB is always available to any of the terminal device drivers, the UCB is not shown in the drawings.

Information passing from the CPU to the terminal in the VMS system can be passed in one of two ways. The terminal independent device driver includes several registers which store information for direct transfer to the terminal dependent device driver. If the information to be passed is a single character, it can be placed in the general registers and passed directly from the terminal independent device driver to the terminal dependent device driver by use of the Port Vectors. If the information is more than a single character, such information to be transferred is stored in physical main memory and directions or a pointer to the location of the information in memory is placed in the general registers in the CPU and passed from the terminal independent device driver to the terminal dependent device driver through the Port Vectors. At the same time, control of the CPU is turned over to the terminal dependent device driver which then, through another communication direction referred to as the Get Vector, transfers the information from the CPU's memory directly to memory in the hardware terminal controller; this transfer may be done by either the terminal dependent device driver or the hardware terminal controller. Whether one character or many characters are output, the Port Vectors and terminal UCB serve as a directing means to identify the proper terminal device and direct information to the terminal dependent device driver so that it reaches the proper terminal device.

In reverse fashion, when a terminal sends information to the CPU, it has to let the CPU know from which terminal the information is coming. When information from a terminal device reaches the terminal dependent device driver, such driver looks up the identifying information by which the terminal independent device driver identifies the terminal from which the information comes and through such identifying information, known as the terminal UCB, looks up the Put Vector in said UCB and then transfers the information to the terminal independent device driver through the Put Vector. As mentioned earlier, the address of the terminal device's UCB is always stored in a specific general register. Again, such information transfer can be accomplished in two ways. When the information is a single character in length, it is stored in general registers in the terminal dependent device driver and can be transferred directly from the terminal dependent device driver to the terminal independent device driver. If the information is longer than a single character, then such information is stored in memory by either the terminal dependent device driver or the hardware terminal controller and directions or a pointer to the information is passed via the Put Vector through the general registers in the CPU to the terminal independent device driver which then, transfers the information to a temporary buffer controlled by the terminal independent device driver. In either case, the Put Vector and terminal UCB serve as directing means to identify the proper terminal device and direct information to the terminal independent device driver so that it is properly identified as to the terminal from which it came.

The Get Vector which in many instances facilitates two way communication and information transfer between the two drivers is considered as part of each of the directing means which couple the two drivers together for information transfer.

The drivers in VMS, both device independent and device dependent, are separate and exist as separate executable images stored in separate disk files in the system. These drivers are created and exist as software. The hardware terminal controller and the terminals themselves represent actual hardware. The controller and the terminals are connected by a hardware communication link. When the system starts up, VMS automatically loads the drivers into various sections of system physical memory. New drivers can be added and loaded at anytime. In the drawings, the drivers, which represent software, and the hardware are shown as rectangular boxes. Data structures which represent stored data, such as the Port Vectors, are represented with rounded corners.

While operation of the VMS system has been described in a general sense above, a more detailed description as to program structure and steps follows.

Since the drivers are not bound into the operating system by a link editor, VMS requires all drivers to use position-independent code and to follow a rigid protocol in handling user requests and servicing device interrupts. Part of this protocol requires a description of various data structures for handling user requests and interrupts. Some of these structures are:

Channel Request Block (CRB)—Used to handle the allocation and transfer of data to the device hardware controller.

Unit Control block (UCB)—There is a UCB for each unit of a particular device type. The drivers use this block to store information about each unit. Such information is generally device dependent, but usually includes at least the following items: pointer to the CRB, device unit number, owner process identification, device characteristics, device status (on-line, busy, waiting for interrupt and/or timeout), device state (reading, writing, output stopped, etc.,), information about I/O currently being handled, pointer to IRP (described below) currently being processed, and saved registers and program counter if driver execution is suspended.

I/O Request Packet (IRP)—A driver can actually complete the processing of an I/O request while allowing the calling user process to continue executing. When this occurs the I/O request is placed in an IRP and is then delivered by the I/O scheduler to a STARTIO routine in the device driver code. When the I/O is completed the driver causes the operating system to set an event flag. The user process can then check this flag to verify that the I/O has in fact completed. The IRP includes the following information: requesting process identification, address of requested device's UCB, type of request (read, write, set characteristics, etc.), address of user buffer, length of user buffer, and event flag to set when I/O request is completed.

As explained above the individual terminal independent device drivers and the terminal dependent device drivers are not connected directly together but communicate via a VAX jump subroutine through special Vector tables (i.e. Port Vectors, Get Vector, and Put Vector) which are included at a known position in each driver. The address of the Vector tables for a particular device is always placed in the UCB. The Port Vector table contains the Port Vectors which point to port driver routines in the terminal device dependent driver. The special port driver routines which are of particular interest for this invention are:

Start Terminal Output—This routine is used to initiate the terminal controller to ensure that it will cause an output interrupt to occur. It also is used to make sure that the data passed in the general registers is ready to output as soon as the interrupt occurs. Consequently, this routine has the following input from the general registers:

Input: Register 5 contains address of terminal's UCB. Register 3 contains either the character to output or the address of the data in memory to output and register 2 contains the number of characters to output. A condition code is set to indicate which case applies.

Start Terminal DMA Output—This routine is functionally the same as the Start Terminal Output routines. However, it is able to set up a direct memory access (DMA) transfer to be performed by the hardware terminal controller. Although the input is specified through different registers, it remains the same, except more than one character is always output if this routine is called.

In addition, the terminal dependent device driver can call routines in the terminal independent device driver in order to retrieve more characters to output and to give it input characters from the terminal. The addresses for these routines are stored in the Get and Put Vectors in the terminal device's UCB. These routines are described below:

Get Output Data—This routine is called whenever an output interrupt occurs and there is no more data to output to the terminal. Whenever an output interrupt occurs, the output interrupt routine in a driver like DZDRIVER immediately ouputs any data that was passed earlier to the Start Terminal Output routine. Once this data has been outputed and another output hardware interrupt occurs, the interrupt routine calls the get output data routine via the Get Vector to get more data to output. If there is no more data to output, then the interrupt routine does not ask the controller to generate another output interrupt, thereby terminating the output sequence. The Get Output Data routine has the following input and output passed through the general registers:

Input: Register 5 contains the address of the terminal's UCB.

Output: Register 3 contains either the character to output or the address of the data in memory to output and register 2 contans the number of characters to output. A condition code is set to indicate which case applies.

Put Input Data—Whenever input is available from a terminal, the hardware controller generates a terminal interrupt. This in turn causes VMS to call the terminal input interrupt routine in the terminal dependent device driver. This routine then reads the character from the controller and then calls the Put Input Data routine via the Put Vector to let the terminal independent device driver process, echo and buffer the character. Eventually the terminal independent device driver passes a stream of terminal input to the user process requesting it. The Put Input Data routine has the following input and output:

Input: Register 3 contains the input character from terminal. Register 5 contains the address of the terminal's UCB.

Output: The Put Input Data routine calls the Get Output Data routine in order to output any echo for the typed characters. Thus the output from the Put Input Data routine is the same as the output from the Get Output Data routine.

Thus, as shown in FIG. 1 the output information from VMS to a terminal passes through the terminal independent device driver through the Port Vectors or Get Vector which direct the information to the appropriate terminal dependent device driver which, in turn, directs the information to the appropriate hardware terminal controller which actually causes the information to appear at the appropriate output terminal. With information from the terminal, it passes through the hardware terminal controller to the terminal device dependent driver which directs the information through the appropriate Put Vector to the terminal independent device driver which then directs the information on to the CPU.

When it is desired to monitor a particular terminal device using another terminal device, herein referred to as an auxiliary terminal device, it is necessary to effectively connect the auxiliary terminal device in parallel with the device to be monitored. As used in this application, the term "effectively parallel" a terminal device does not mean a true electrical parallel connection of the auxiliary terminal device and the terminal device being monitored, but merely a hook up or linking of the two terminal devices so that information from the CPU to the monitored terminal device appears at both terminal devices. In some instances the linking will also provide for information entered at the auxiliary terminal device to be directed to the CPU and appear on both terminal devices.

In order to create the parallel linking of the desired terminal devices it is necessary to create another driver device, herein arbitrarily referred to as a user controlling driver or UC Driver, and to create another device for each terminal to be monitored, herein arbitrarily referred to as a user controlling device or UC Device. FIG. 2 shows a UC Driver and UC Device. In order to direct information from the terminal independent device driver to the UC Driver, it is necessary to insert a set of New Port Vectors and a New Get Vector for the output of the terminal independent device driver. Similarly, in order to direct information from the terminal dependent device drivers to the UC Driver, it is necessary to insert a New Put Vector at the output of the terminal dependent device drivers. These are shown as blocks labeled "New Port Vectors" and "New Put Vector." The UC Driver is a software driver not inherent or existing in the VMS software and is created by a programmer in accordance with the invention which may be loaded using the normal driver loading procedure provided by VMS. Once the driver is loaded it remains in main memory until the system is taken down. When needed, the UC Driver creates a UC Device and the necessary New Port Vectors, New Put Vector and New Get Vector.

UC Driver allows a system manager to create as many UC Devices as he desires. Each of these software devices is capable of monitoring any terminal on the system. However, each device can only monitor one terminal at a time. Therefore, if ten terminals need to be monitored simultaneously then the system manager should create 10 UC Devices. This can be done through normal DEC utilities provided with VMS. The UC Driver is basically a program device and is shown as a rectangular box in the drawing while the individual UC Devices are data structures and shown with rounded corners.

In general terms, the UC Driver is set up to take the place of and act as the terminal dependent device driver when looking from the terminal independent device driver and to take the place of an act as the terminal independent device driver when looking from the terminal dependent device driver. Initially the UC Driver creates a UC Device and the New Port Vectors, New Put Vector and New Get Vector. These are set up and exist separately from the system. This is shown in FIG. 2 where the system of FIG. 1 exists as in FIG. 1 and the UC Driver, UC Device, New Port Vectors, New Put Vector, and New Get Vector exist separately as shown.

Figure 3:
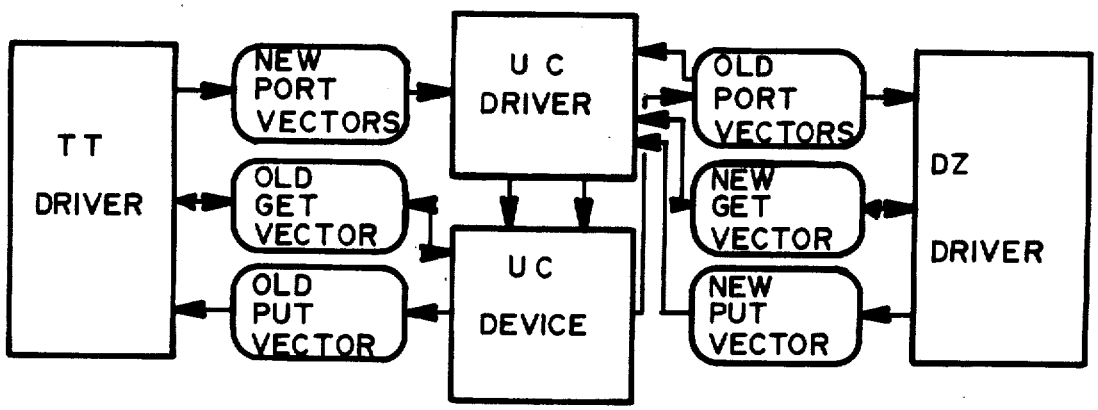

In order to monitor a desired terminal, the links as shown in FIGS. 1 and 2 are broken so that the UC Driver, UC Device, New Port Vectors, New Put Vector and New Get Vector are inserted and linked as shown in FIG. 3. With this arrangement, all information from the CPU's operating system to be directed to the terminal device being monitored is directed from the terminal independent device driver through the New Port Vectors, and in some cases, as described above, using the Old Get Vector, to UC Driver. It is then directed through the UC Device and the Old Port Vector, sometimes also using the New Get Vector, to the terminal dependent device driver. Information from the terminal is directed by the New Put Vector, and in some cases, as described above, using the New Get Vector, to UC Driver. It is then directed through the UC Device and the Old Put Vector, again sometimes also using the Old Get Vector, to the terminal independent device driver. As the information passing in either direction between the CPU and the terminal passes through the UC Driver, the UC Driver sets up the information so that it can be made available to an auxiliary terminal device. This usually will take the form of at least one memory buffer into which the information is placed and a program in the system that accesses the memory buffer and transfers the information to the auxiliary terminal. Where it is desired to use the auxiliary terminal not only to monitor a terminal but also to provide input to the system, the program will also provide for taking input from the auxiliary terminal and providing it to the UC Driver for further transmission to the CPU.

We now turn to a more detailed discussion of the UC Driver, UC Device, and their operation and linking into the system. Each UC Device has a UCB associated with it as mentioned above. However, no hardware is associated with the devices. The UCB does contain the following additional information:

Address of monitored terminal's UCB
Monitored terminal's Old Get Vector
Monitored terminal's Old Put Vector
Address of monitored terminal's Old Port Vector Table
Address of buffer to hold terminal output
Size of buffer to hold terminal output
Current position pointer within output buffer
Address of buffer to holf terminal input
Size of buffer to hold terminal input
Current position pointer within output buffer In addition, the UC Driver maintains a list of the UCB for each monitored terminal and the UCB for each corresponding UC Device. This list is used at times to find out which UC Device UCB belongs with a given terminal UCB.

In order to use a UC Device a user program just calls and performs a normal VMS ASSIGN system service as described in the *VAX/VMS System Services Guide* published by Digital Equipment Corporation. This service assigns a channel number that is to be used by the user program in conjunction with all I/O calls to the UC Device. As with all I/O calls VMS automatically uses this channel number to figure out the appropriate UCB associated with the I/O request and passes the address of this UCB on to UC Driver.

Different I/O operations like Read, Write, Set up Monitoring and Take Down Monitoring are performed using the QIO system service provided by VMS again as described in the *VAX/VMS Systems Service Guide*. The user program simply passes a function code indicating which particular I/O service it desires from the device driver. The device driver protocol as described in the *VAX/UMS Guide to Writing A Device Driver* as referred to earlier allows a driver to define a variety of different functions and the addresses of the subroutines within the driver which are designed to handle those functions.

Whenever a program wishes to cause UC Driver to begin monitoring a given terminal it assigns a free UC device and then performs a QIO call with the following input.

Function Code = Set Up Monitoring
UC device identifier (VMS channel number)
Name of terminal to monitor UC Driver then breaks the logical link and inserts itself between the terminal independent device driver and the terminal dependent device driver. If insertion was successful it returns a success status to the user, otherwise it tells the user that an error occured.

UC Driver actually breaks the normal logical link in VMS to move from FIG. 2 to FIG. 3 as follows:

1. It calls a VMS routine which takes the terminal name for input and returns the address to the corresponding terminal UCB as output.
2. The program allocates a section of memory large enough to hold the terminal's Port Vector table (it is pointed to by the terminal UCB).
3. The program copies the terminal's Port Vector Table to the new section of memory. This will become the New Port Vector Table.
4. The address for the terminal's Port Vector table is stored in the UC device's UCB. This is now referred to as the Old Port Vector Table.
5. The addresses for the terminal's Start Terminal Output and Start Terminal DMA Output routines in the New Port Vector table are changed to point to UC Driver's own UCStart Terminal Output and UCStart DMA Terminal Output routines.
6. The terminal UCB and the UC Device's UCB are added to UC Driver's list of monitored terminals.
7. UC Driver allocates two memory buffers, one to hold the data being outputed to the terminal and another to hold the data being inputed from the terminal. The addresses of these buffers are stored in the UC Device's UCB. The starting addresses of these buffers are also placed in the current position pointers in the UC Device's UCB, thereby indicating that the buffers are empty.
8. The driver temporarily disables interrupts at this point to keep the terminal device it is monitoring from interrupting the CPU while the terminal's UCB is in an unstable state.
9. The address of the Port Vector table in the terminal UCB is changed to point to the New Port Vector table. Thus, TT Driver will call UC Driver's Start Terminal Output routines rather than the terminal dependent device driver's routine.
10. The address of the Get Output Data routine (Get Vector) and the address of the Put Input data routine (Put Vector) that are stored in the terminal's UCB are saved in the UC Device's UCB as the Old Get Vector and the Old Put Vector. Then UC Driver changes the addresses stored in the terminal's UCB so that UC Driver's UCGet Output Data and UCPut Input Data routines will be called instead. These changed addresses in the terminal's UCB are the New Get Vector and the New Put Vector.
11. Interrputs are reenabled.

At this point the link has been broken and all data between the terminal independent device driver and the terminal will flow into UC Driver.

Once the connections have been made as in FIG. 3 and as described above, all terminal output passes through one of the UC Driver subroutines: UCStart Terminal Output, UCStart Terminal DMA Output, and UCGet Output Data. In order to emulate the normal Start Terminal Output and Start Terminal DMA Output routines. UC Driver's routines preserves the input passed to the routines and calls the device dependent driver's Start Terminal Output and Start Terminal DMA Output routines, just before exiting. UC Driver knows where these routines are because it stored the addresses to the Old Port Vector table in the UC Device's UCB. When the UC Start Terminal Output and UC Start Terminal DMA Output routines are called with the address of the terminal's UCB, UC Driver uses that address to look up the corresponding UC Device's UCB in UC Driver's list of monitored terminal's. Now with the UC Device's UCB it can find the address of the Old Port Vector table for the terminal and finally through this table it can get the address of the appropriate Start Terminal Output routine in the terminal dependent device driver.

A significant amount of output data also flows through the UCGet Output Data routine. This routine is called by the terminal dependent device driver in order to get more data to output. As in the case of the Start Terminal Output routines, UC Driver figures out the corresponding UC Driver's UCB using UC Driver's list of monitored terminal's. It then uses the Old Get Vector in the UC Device's UCB to call the Get Output Data routine in the terminal independent device driver which returns additional data to output as described before. UC Driver carefully preserves this output so that when it exits, the output is available to the calling terminal dependent device driver just as though the driver had called the terminal independent device driver's Get Output Data routine.

Although terminal output data flows through three routines in UC Driver, terminal input and any resulting echo back flows through only one routine, UC Put Input Data. This routine is entered with the same input as the terminal independent device driver's Put Input Data routine which is described earlier. As in the other three routines, UC Driver first looks up the corresponding UC device's UCB for the given terminal UCB. It then uses the Old Put Vector in the UC device's UCB to call the Put Input Data routine in the terminal independent device driver which returns any data to echo back to the terminal. UC Put Input Data carefully preserves the output which contains the echo back (if any) from the input. In this way it appears to the device dependent driver that it had just called the TT Driver Put Input Data routine directly.

The reason for passing all data through the UC Driver is to make such data available to an auxiliary terminal device, thus effectively paralleling the two terminal devices. For this purpose, the information passing through the UC Driver is stored in memory buffers associated with the UC Device and such information is then accessed and sent to the auxiliary terminal device. The memory is accessed and the information sent to the terminal device by means of a program.

As described earlier, the UCStart Terminal Output and UCStart Terminal DMA Output are both called with input parameters containing the data to output to the terminal. Before UC Driver exits it records this information in the output buffer pointed to by the UC device's UCB. This buffer is shown as the Output Buffer in FIGS. 4, 6, and 8. Also, after UCGet Output Data calls TT Driver's Get Output Data routine, via the Old Get Vector it now has access to the terminal output returned by this routine and it records this output in the same output buffer. Similarly, after UCPut Input Data calls TT Driver's Put Input Data routine via the Old Put Vector, it now has access to the echo back and records this echo back in the same output buffer.

The UCPut Input Data routine is called with general register 3 containing the input character. This character is placed in the input buffer shown as the Input Buffer in FIGS. 4, 6, and 8.

Data is always placed into the buffer starting at the current position pointer which is stored in the UC Device's UCB. When data is placed into either of these buffers the corresponding pointer to the current position is updated to point to the next free byte in the buffer. When both buffers are full data will be discarded. However, if the user program accessing the UC Device empties the buffers on a regular basis, this will not happen.

Figure 4:
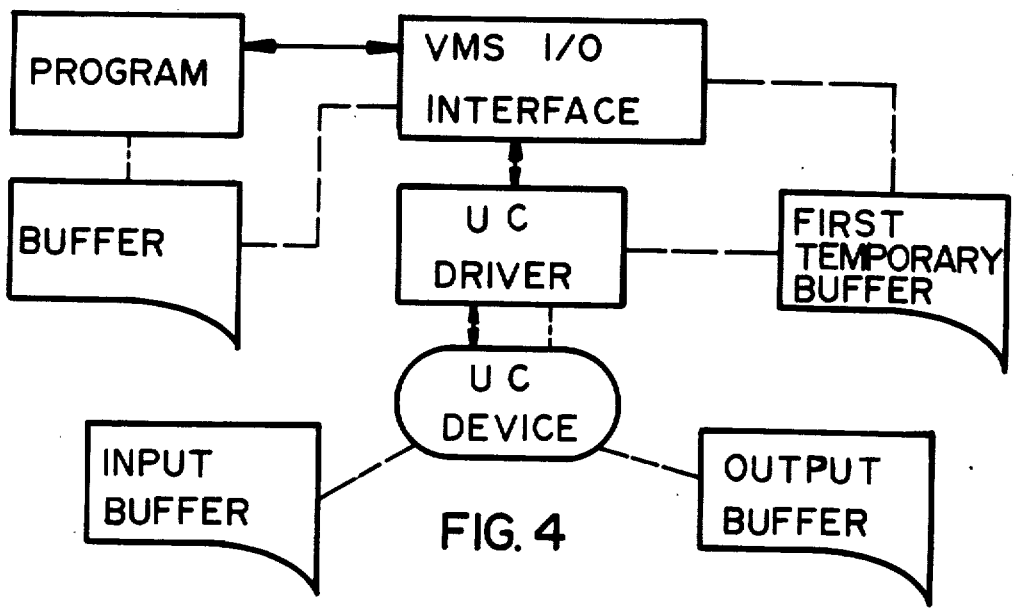
Figure 5:
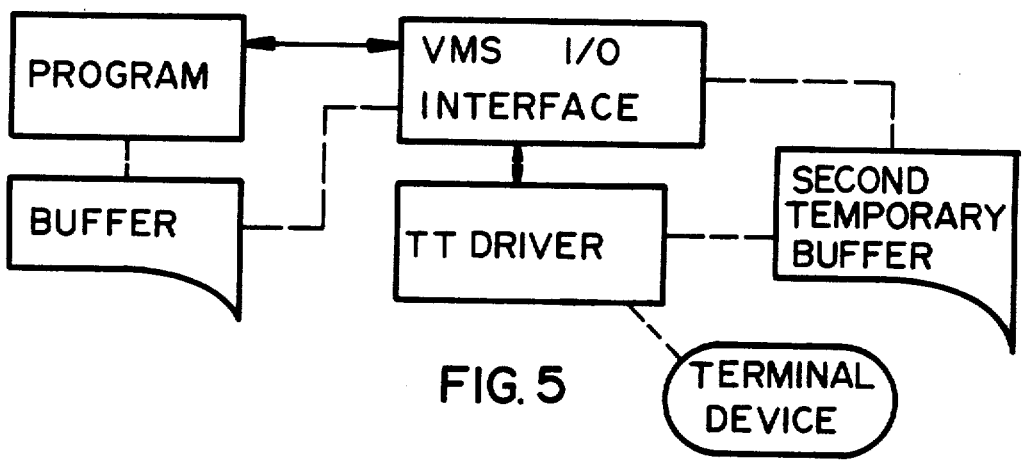
Figure 6:
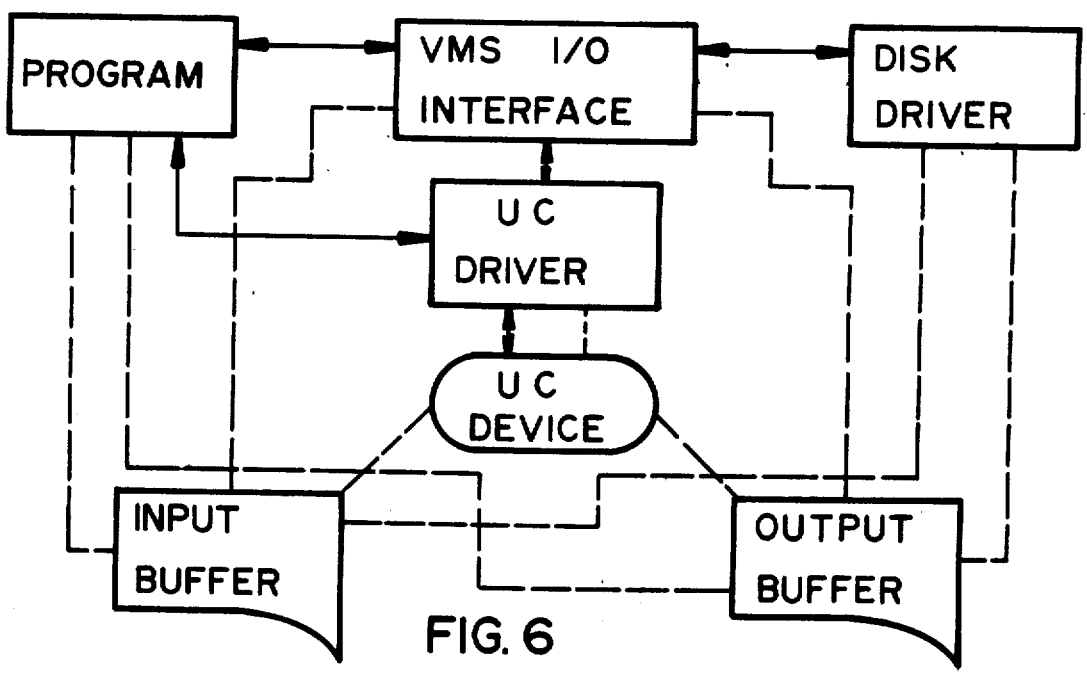
Figure 8:
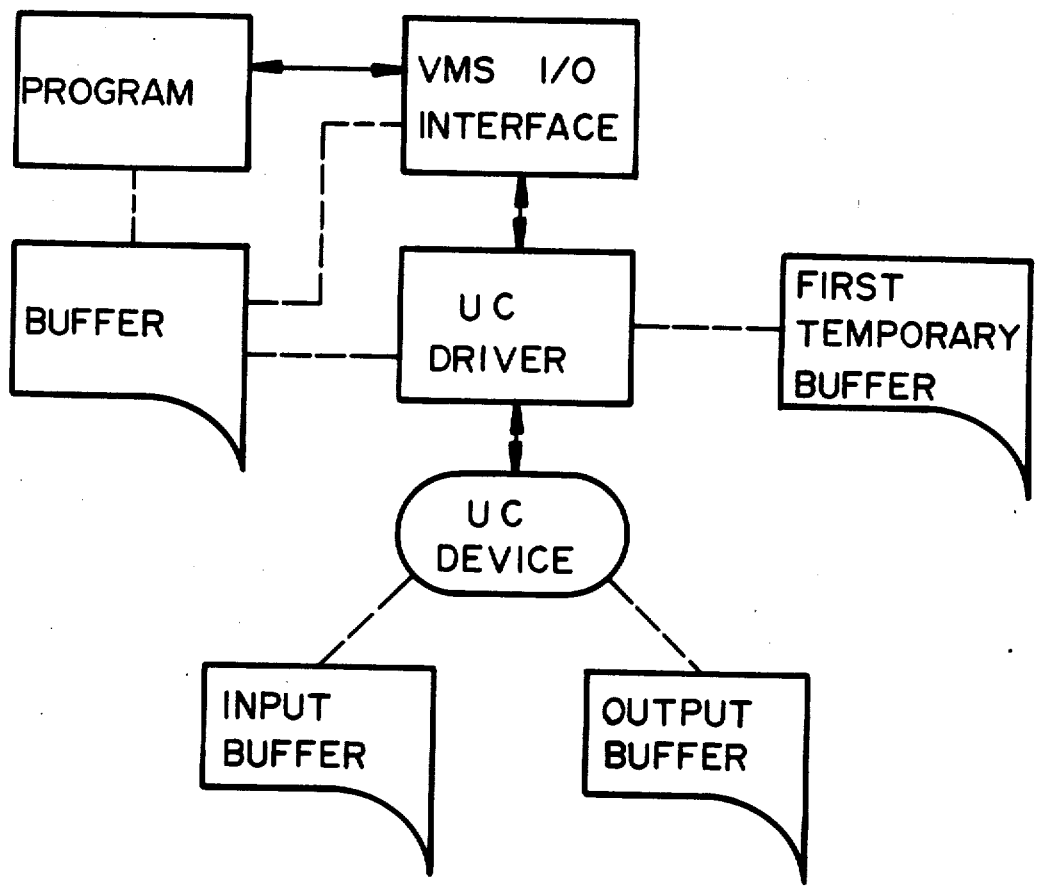
Figure 7:
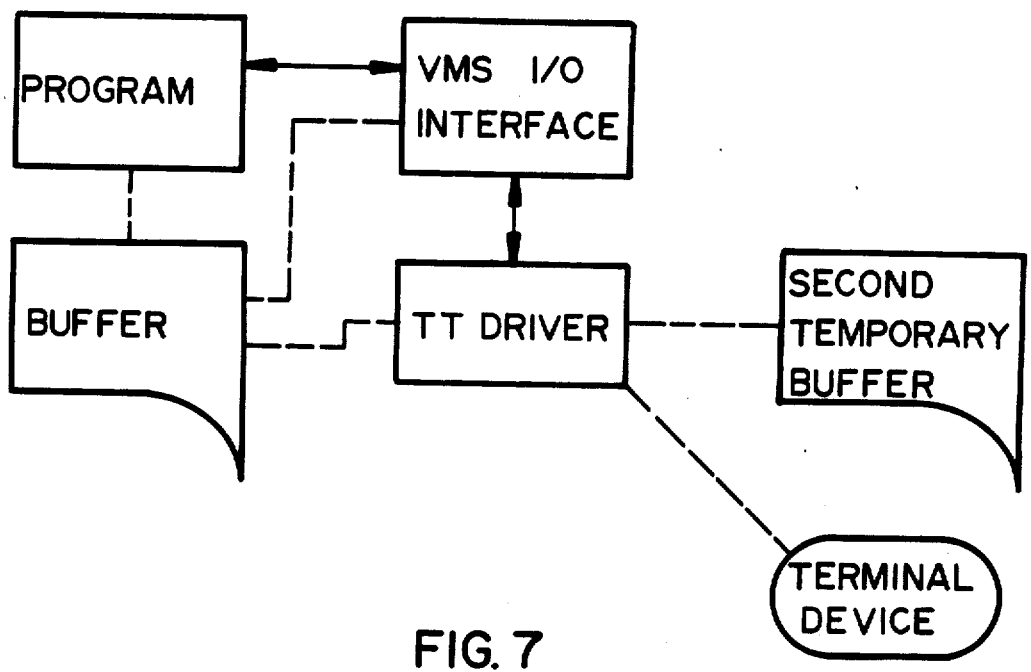

FIGS. 4, 5, and 6 show general user program arrangements for accessing the information in the Input and Output Buffers and feeding such information to an auxiliary terminal device while FIGS. 7 and 8 show a general user program arrangement for accepting information from an auxiliary terminal device and forcing it into the Input and Output buffers so that it is supplied to the CPU as if it had come frm the monitored terminal.

As shown in FIG. 4 the user program, indicated as box labeled Program, is linked to the operating system input/output inerface, here labeled VMS I/O Interface. The VMS I/O Interface is linked to the UC Driver which is linked to the UC Device. Such linkage is shown by solid lines between the blocks. The UC Device is shown as having accesses to the Input Buffer and the Output Buffer. The access is shown by broken lines. Thus, the Input buffer is an information structure that the UC Driver has access to through the UC Device, also an information structure. As described above, as information passes through the UC Driver and UC Device, UC Driver causes the information to be placed into the Input Buffer or Output Buffer as appropriate. To access such information, the program works through the VMS I/O Interface to cause the UC Driver to transfer the information, if any, from the Input Buffer (information from the terminal to the CPU) to a First Temporary Buffer. Once in the First Temporary Buffer, the program, again through the VMS I/O Interface, causes the information to be transferred to the Buffer. Moving to FIG. 5, the Buffer, Program, and VMS I/O Interface are the same as shown in FIG. 4, but have been separated for ease of illustration. The Program causes the information now in the Buffer to be transferred to a Second Temporary Buffer from where it is directed by the program through the VMS I/O Interface and the terminal independent device driver (TT Driver) to the terminal device in normal VMS manner as shown in FIG. 1. Thus, in FIG. 5, the Terminal Device is represented as a data structure. It actually includes everything to the right of TT Driver in FIG. 1 and the information from the Second Temporary Buffer is transferred via the TT Driver, Port Vectors and Get Vector, Terminal Dependent Device Driver, and Hardware Terminal Controller to the desired auxiliary terminal. After information from the Input Buffer of FIG. 4 has been transferred, information from the Output Buffer is similarly transferred and then the process is repeated as long as new information is placed by UC Driver in either of the Input or Output Buffers. FIGS. 4 and 5 together show one way in which a program can access and cause the information stored in the Input and Output Buffers to be monitored by an auxiliary terminal device.

While the program descrbed above takes information from the input buffer first and then from the output buffer, a program could take information from the output buffer first. It is currently preferred to look at the Input buffer first because generally there will be less information going into the Input buffer than into the Output buffer. This seems to provide a more equitable distriuiton in looking at both buffers. Also, while an input and output buffer memory is used and is preferred, a single memory buffer could also be used.

FIG. 6 shows an alternate, and more direct way in which information from the Output and Input Buffers may be transferred to a auxiliary terminal device such as a disk or other secondary memory device for direct storage. In this embodiment, the Program through VMS I/O Interface and thrugh direct linkage with UC Driver, sets up a direct access to the Input Buffer and Output Buffer by the Program and the VMS I/O Interface so that information in the Output Buffer is transferred directly to the Disk Driver and placed in disk memory and similarly, information in the Input Buffer is transferred directly to the Disk Driver and placed in disk memory. The embodiment of FIG. 6 is used when a terminal is to be monitored such that the information passing to or from the terminal is stored for later use. It is not used for interactive use of an auxiliary terminal device.

FIGS. 7 and 8 are similar to FIGS. 4 and 5 in that they show the same block arrangement, but show information access links differently. FIGS. 7 and 8 show the linkage for forcing information from an auxiliary terminal into UC Driver from where it is sent to the CPU and appears on the monitored terminal. FIG. 7 shows the program linked to the VMS I/O Interface which is linked to TT Driver. As in FIG. 5, the Terminal Device block is indicated as a data structure and includes the Put Vector, Get Vector, Terminal Dependent Device Driver, Hardware Terminal Controller and Terminal as shown in FIG. 1. The terminal in this case is the auxiliary terminal. The information fed from the auxiliary terminal is transferred through VMS I/O Interface and TT Driver to the Second Temporary Buffer from where it is transferred to the Buffer. There, moving to FIG. 8, the information is transferred from the Buffer to the First Temporary Buffer where it is then treated as input from the monitored terminal by UC Driver and UC Device and placed in the Input Buffer generally by calling the UC Put Input Data routine. As that input is echoed back from the CPU, it goes into the Output Buffer and also appears on the monitored terminal as information entered by the terminal into the CPU.

From this general description of the Program function, any person skilled in the computer programming art and familiar with VMS programming could set up the specific program necessary to access and monitor the information. The actual access by the program is initiated by doing a QIO request with a read Function Code. The request passes the following output:

Input:
Function Code=Read
Assigned channel number for UC Device
Address of user buffer to receive data
Address of place to return extended status
Output:
User buffer contains data read
Extended status contains number of bytes read and a bit indicating whether the data read is terminal input or output The user program uses the extended status word to determine how many bytes were read from the UC Driver and whether the data read is terminal input or output.

When the UC Driver receives a read request of this type, it follows these steps:

1. Disables Terminal Interrupts. A terminal interrupt could mess up the Terminal Input and Output buffers.
2. If there is any data in the Terminal Input Buffer, UC Driver moves all of the data from the Terminal Input Buffer up until the current position pointer into the user program's read buffer and sets the status bit indicating that the data is terminal input. The current position pointer in the UC device's UCB for the Terminal Input Buffer is reset to point to the beginning of the buffer to indicate that it is empty.
3. Otherwise, if there is no data in the Terminal Input Buffer, UC Driver moves all of the data from the Terminal Output Buffer up until the current position pointer into the user program's read buffer and sets the status bit indicating that the data is terminal output. The current position pointer for the Terminal Output Buffer is rest to point to the beginning of the buffer to indicate that it is empty.
4. UC Driver returns the number of bytes read in the buffer for extended status. If no bytes were read, then a zero is returned.
5. Interrupts are reenabled and the I/O call is completed.

With the user program merely accessing the data, the data may be stored in secondary memory as a log file or audit trail for later use, or the data may be displayed on a CRT terminal or printed out on a hardcopy device.

Where input from the auxiliary terminal is to be directed into the computer system a user program can force input to the process running on the user's terminal. This input looks just like the monitored user had typed that input at his own terminal, even though he didn't. A user program forces input of this type by issuing a QIO call to the UC Device with the following input parameter:

Input:
Function Code=Write
Assigned channel number for UC Device
Data to write
Number of bytes to write
When UC Driver receives a request with a write function code it performs the following steps:

1. Look up the corresponding Terminal UCB for the UC Device and places this in general register 5 as input for calling the Put Input Data routine.
2. Disable terminal interrupts.
3. Move a single byte from the data to write QIO parameter into the register 3 as input parameter for Put Input Data.
4. Call UCPut Input Data which eventually causes TT Driver to think that a character has just be typed on the monitored terminal. Also, UCPut Input Data correctly buffers the echo back. See the previous description of the UC Put Input Data routine.
5. Move the next byte from the data to write QIO parameter into the input parameter for Put Input Data. If there is no next byte, then go to step 6. Otherwise loop back to step 4.

6. Reenable terminal interrupts.

As described earlier UC Driver just discards data once the Terminal Output Buffer is full. However, in order to avoid this situation a feature may be built into UC Driver which allows it to automatically turn off the output to the terminal device call the Terminal Output buffer is emptied.

In the terminal dependent device driver there is a routine called Stop Output which stops terminal output. The address of this routine is found in the Port Vector Table. Whenever, the output buffer is two-thirds full, UC Driver calls this routine in order to stop output. The only input this routine requires is the address of the terminal's UCB. Once the buffer is almost empty, UC Driver calls another routine called Resume Output (its address is also found in the Port Vector Table) which starts the terminal output up again. This routine also requires the address of the terminal's UCB as input.

When it is desired to merely monitor a terminal device a program can be used which runs in the background and records all of the data passing between a monitored terminal and VMS. This data is stored in a log file (on disk or some other secondary memory device) that can be kept for documentation or security purposes. The program does this by executing a "Set up" QIO call to UC Driver giving the terminal to monitor and then doing "Read" QIO calls to UC Driver in order to read the data passing between the terminal and VMS. The data the program reads is then outputed to the log file.

When it is desired to interact with a terminal device, a program can be used which does a "Set Up" QIO call to set up monitoring on a specified terminal. After this it does "Read" QIO calls to retrieve the data going to and from the monitored terminal. This data is then displayed on the specifed user's terminal so that he can watch what is happening.

In addition, the program also provides a mechanism so that if the user hits a character on his terminal, the program issues a "Write" QIO call to the UC Driver so that the character is sent to the monitored user's process just as though the user had hit the character himself.

When a user program has finished monitoring a particular terminal, it can cause UC Driver to disconnect U.C. Driver and reconnect the normal link between the TT Driver and the terminal device dependent driver. It does this by issuing a QIO call with the "take down" function code to UC Driver. As input the user program passes the VMS channel number assigned to the UC device.

When UC Driver executes the take down function it performs the following steps:

1. Remove the monitored terminal's UCB and the corresponding UC Device's UCB from UC Driver's list of monitored terminals.
2. Disable interrupts.
3. Restore the addresses saved in the UC Device's UCB to the terminal's UCB for the Get Vector, Put Vector the Port Vector table.
4. Reenable Interrupts. At this point the terminal is no longer being monitored and the logical link has been reconnected.
5. Deallocate the memory buffer used to hold the New Port Vector table created when the logical link was originally broken.
6. Deallocate the memory buffers used to hold the terminal input and output data.

The invention also contemplates the method of connecting in a computer system as decribed, an auxiliary terminal device effectively in parallel with a selected terminal device of the system so that the selected terminal device can be monitored by the auxiliary terminal The method includes the steps of ceating a UC Driver and a UC Device coupled to the UC Driver and coupling that combination in between the terminal independent device driver and the terminal dependent device driver associated with the terminal device to be paralleled so that the output of the terminal independent device driver intended for the terminal dependent device driver passes through the UC Driver and UC Device before arriving at the terminal dependent device driver and the output of the terminal dependent device driver intended for the terminal independent device driver passes through the UC Driver and UC Device before arriving at the terminal independent device driver and making the information passing through the UC Driver available to an auxiliary terminal device.

Whereas this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A method of controlling the movement of data between a first driver program and a second driver program, the first and second driver programs included in an operating system for a digital computing system, the method comprising the steps of:

generating a third driver program;

identifying an original set of vectors used by the first and second driver programs to establish a communication link between each other;

generating a new set of vectors to establish communication links between (a) the first driver program and the third driver program and (b) the second device driver program and the third driver program;

inserting the new set of vectors in the locations of the original set of vectors; and communicating data between the first and third device driver programs and between the second and third driver programs by way of the communication links established by the insertion of the new set of vectors such that all data passing between the first and second driver programs flows through the third driver program, the flow of data being controlled by the third driver program.

2. A method as defined in claim 1 wherein the digital computing system further comprises an auxiliary terminal device and wherein the method further comprises the step of connecting the auxiliary terminal device to the digital computing system so as to monitor all data input to and output from the selected terminal device associated with the second driver program.

3. A method as defined in claim 1 wherein the digital computing system further comprises an auxiliary terminal device and wherein the method further comprises the step of connecting the auxiliary terminal device to the digital computing system so as to monitor all data input to the selected terminal device associated with the second driver program.

4. A method as defined in claim 1 wherein the digital computing system further comprises an auxiliary terminal device and wherein the method further comprises the step of connecting the auxiliary terminal device to the digital computing system so as to monitor all data output from the selected terminal device associated with the second driver program.

5. A method as defined in claim 1 wherein the digital computing system further comprises an auxiliary terminal device and wherein the method further comprises the step of forcing input to the first driver program and to the second driver program from the auxiliary terminal.

6. A method as defined in claim 1 wherein the step of generating a third driver program comprises the step of generating a third driver program which operates independently of the operating system.

7. A method as defined in claim 1 wherein the step of generating a third driver program comprises the step of providing an executable code listing which emulates the first driver program when conducting input and output with the second driver program.

8. A method as defined in claim 1 wherein the step of generating a third driver program comprises the step of providing an executable code listing which emulates the second driver program when conducting input and output with the first driver program.

9. A method as defined in claim 1 wherein the digital computing system further includes a memory and wherein the method further comprises the step of storing the original set of vectors in the memory.

10. A method as defined in claim 1 wherein the digital computing system further comprises an auxiliary terminal device, a plurality of second driver programs, and a plurality of terminal devices, each second driver program associated with one terminal device, the method further comprising the step of effectively paralleling an auxiliary terminal device with any one of the plurality of second driver programs.

11. A method as defined in claim 1 wherein the digital computing system comprises a plurality of terminal devices and a memory and wherein the method further comprises the steps of:
providing a first location in the memory for storing input to the third driver program;
providing a second location in the memory for storing output from the third driver program;
providing pointers indicating the next available byte in the first and second locations;
providing a pointer to a third location in the memory associated with a selected terminal device; and
providing a flow control flag for controlling the flow of data through the third driver program.

12. A method as defined in claim 1 wherein the digital computing system comprises a buffer located in memory and wherein the method further comprises the step of storing input to the third driver program in the buffer.

13. A method as defined in claim 1 wherein the digital computing system comprises a CPU and wherein the step of inserting the new set of vectors comprises the step of causing the execution of the CPU to jump to the third driver program.

14. A method as defined in claim 1 wherein the digital computing system comprises an auxiliary terminal device and wherein the method further comprises the step of providing a user program for (a) accessing the data flowing through the third driver program and for (b) making the data available to an auxiliary terminal device.

15. A method as defined in claim 14 wherein the user program comprises the steps of:
directing the third driver program to place a data word in the buffer; and
outputting the data word to the auxiliary terminal device.

16. A method as defined in claim 15 wherein the user program further comprises the steps of:
monitoring the buffer;
halting the input to the buffer from the second driver program when the buffer is nearly full;
directing a routine which is called from the user program to read the data in the buffer; and
resuming the input to the buffer from the second driver program after the user program has read the data in the buffer.

17. A method as defined in claim 14 wherein the user program comprises the steps of:
accepting input from the auxiliary terminal device;
placing the input in an allocated portion of the memory associated with the third driver program; and
forcing the input to both the first driver program and the second driver program.

18. A method as defined in claim 1 wherein the digital computing system comprises a memory and wherein the method further comprises the step of saving the original set of vectors in the memory.

19. A method as defined in claim 18 further comprising the steps of:
breaking the communication link between the first, second, and third driver programs, such that no data flows through the third driver program;
removing the new set of vectors from the locations of the original set of vectors;
replacing the original set of vectors in their original locations; and
reestablishing the communication link between the first and second driver programs.

20. A method as defined in claim 1 wherein the digital computing system comprises a selected terminal and wherein the step of inserting the new set of vectors comprises the steps of:
disabling interrupts from a selected terminal device;
inserting the new set of vectors; and
enabling interrupts from the selected terminal device.

21. A method as defined in claim 1 wherein the digital computing system comprises an addressable memory and wherein the step of inserting the new set of vectors comprises the step of moving an address associated with a third driver program communication routine into the locations in an allocated portion of memory associated with the second driver program.

22. A method as defined in claim 21 wherein the allocated portion of memory structure comprises a unit control block.

23. A method as defined in claim 1 wherein the first driver program comprises a terminal independent device driver and the second device driver program comprises a terminal dependent device driver and wherein the step of inserting the new set of vectors comprises the step of moving an address location of at least one communication routine associated with the third driver program into the locations for a vector associated with the terminal independent device driver and the terminal dependent device driver.

24. A method of programming a digital computing system so as to connect an auxiliary terminal device in parallel with a selected terminal device, wherein the digital computing system includes a CPU, a memory for storing executable instructions and data, the selected terminal device, an auxiliary terminal device, and an operating system for controlling the flow of data between the CPU and the selected terminal device, and wherein the operating system includes a first device driver associated with the CPU, a second device driver associated with the selected terminal device, and a data communication pathway connecting the first and second device drivers, the method comprising the steps of:
generating a driver program adapted for communicating with both the first and second device drivers;
allocating a portion of the memory for receiving and storing data passed between the CPU and the selected terminal device;
breaking the communication pathway and inserting in the pathway the driver program;
reestablishing the communication pathway between the first and second device drivers such that all data flows through the driver program without any apparent interruption at the CPU or at the selected terminal device; and
placing the data passed between the CPU and the selected terminal device in a location in the allocated portion of memory whereby the data is accessible by the auxiliary terminal device.

25. A method as defined in claim 24 further comprising the step of connecting the auxiliary terminal device to the digital computing system so as to monitor all data input to and output from the selected terminal device.

26. A method as defined in claim 24 further comprising the step of connecting the auxiliary terminal device to the digital computing system so as to monitor all data input to the selected terminal device.

27. A method as defined in claim 24 further comprising the step of connecting the auxiliary terminal device to the digital computing system so as to monitor all data output from the selected terminal device.

28. A method as defined in claim 24 further comprising the step of forcing input to the first device driver and the second device driver from the auxiliary terminal device.

29. A method as defined in claim 24 wherein the step of generating a driver program comprises the step of generating a driver program which is executed independently of the operating system.

30. A method as defined in claim 24 wherein the step of allocating a portion of memory comprising the step of allocating sufficient space in the memory to store a plurality of vectors associated with the driver program.

31. A method as defined in claim 24 wherein the digital computing system comprises a plurality of second device drivers, and a plurality of selectable terminal devices, each second device driver associated with a selectable terminal device, and wherein the method further comprises the step of selectively connecting in parallel one auxiliary terminal device with any one of the selectable terminal devices.

32. A method as defined in claim 24 wherein the step of allocating a portion of the memory comprises the step of allocating space in the memory for containing pointers to vectors used to maintain the communication pathway between the driver program and the first device driver and the second device driver.

33. A method as defined in claim 24 wherein the step of breaking the communication pathway and inserting in the pathway the driver program comprises the step of causing the execution of the CPU to jump to the driver program.

34. A method as defined in claim 24 wherein the method further comprises the step of providing a user program and wherein the user program comprises the steps of:
reading a data word received from the first device driver or the second device and stored in the allocated portion of memory;
placing the data word in a buffer; and
outputting the data word to the auxiliary terminal device.

35. A method as defined in claim 34 wherein the driver program further comprises the steps of:
monitoring the buffer;
halting the input to the buffer from the selected terminal device when the buffer is nearly full;
directing a routine which is called from the user program to read the data in the buffer; and
resuming the input to the buffer from the selected terminal device and the CPU after the user program has read the data in the buffer.

36. A method as defined in claim 24 wherein the method further comprises the step of providing a user program and wherein the user program comprises the steps of:
accepting input from the auxiliary terminal device;
placing the input in the allocated portion of memory; and
directing the driver program to force the input to both the first device driver and the second device driver.

37. A method as defined in claim 24 further comprising the steps of:
breaking the communication pathway such that no data flows from the first device driver and the second device driver;
removing the driver program from the communication pathway; and
reestablishing the communication link between the first device driver and the second device driver.

38. A method as defined in claim 24 wherein the communication pathway is maintained by an original set of vectors and wherein the step of breaking the communication pathway and inserting a driver in the pathway comprises the steps of:
disabling interrupts from the selected terminal device;
overwriting the original vectors which establish the communication pathway between the first and second device drivers with new vectors which point to the driver program; and
enabling interrupts from the selected terminal device.

39. A method as defined in claim 38 wherein the step of overwriting the original vectors comprises the step of moving the addresses of the communication routines associated with the driver program into the locations of the original vectors.

40. A method as defined in claim 39 wherein the first device driver comprises a terminal independent device driver and the second device driver comprises a terminal dependent device driver and wherein the step of moving the addresses of the communication routines comprises the step of moving the locations of the communication routines into the vector locations associated with the terminal independent device driver and the terminal dependent device driver.

41. A method of programming a digital computing system including at least one terminal device, an auxiliary terminal device, an operating system having a terminal independent device driver program and at least one terminal dependent device driver program associated with each terminal device, the terminal independent device driver program and the terminal dependent device driver program having a communication link established between each other by way of an original set of vectors, the method comprising the steps of:

generating a user driver program structured to (a) emulate the terminal dependent device driver program when communicating with the terminal independent device driver program and to (b) emulate the terminal independent device driver program when communicating with the terminal dependent device driver program;

allocating a portion of memory to store the original set of vectors and to store data passing between the terminal independent device driver program and the terminal dependent device driver programs;

generating a new set of vectors to establish a communication link between (a) the terminal independent device driver program and the user driver program and (b) the terminal dependent device driver program and the user driver program;

establishing a communication link between the user driver program and the terminal independent device driver program and the terminal dependent device driver program by moving the new set of vectors into the location of the original set of vectors such that all data passing between the terminal independent device driver and the terminal dependent device driver flows through, and the flow may be controlled by, the user driver program; and moving the data passing through the user driver program to a location where it may be monitored by an auxiliary terminal device.

42. A method as defined in claim 41 further comprising the step of forcing input to the terminal independent device driver program and the terminal dependent device driver program from the auxiliary terminal device.

43. A method as defined in claim 41 wherein the step of generating a user driver program comprises the step of generating a user driver program which method operates outside of the operating system.

44. A method as defined in claim 41 further comprising the step of saving the original vectors.

45. A method as defined in claim 44 further comprising the steps of:

disabling the flow of data from the terminal independent device driver program and the terminal dependent device driver program;

removing the communication link between the user driver program and the terminal independent device driver program and the terminal dependent device driver program; and replacing the original set of vectors to reestablish the communication link between the terminal independent device driver program and the terminal dependent device driver program so as to restore the original communication link therebetween.

46. A method as defined in claim 41 further comprising the step of selectively connecting in parallel one auxiliary terminal device with any one of the terminal devices.

47. A method as defined in claim 41 further comprising the step of providing a user program, the user program comprising the steps of:

directing the user driver program to place a data word in a buffer; and outputting the data word to the auxiliary terminal device.

48. A method as defined in claim 47 wherein the user program further comprises the steps of:

monitoring the buffer;

halting the input to the buffer from a selected terminal dependent device driver program when the buffer is nearly full;

directing a routine which is called from the user program to read the data in the buffer; and resuming the input to the buffer from the selected terminal dependent device driver program after the user program has read the data in the buffer.

49. A method as defined in claim 41 further comprising the step of providing a user program, the user program comprising the steps of:

accepting input from the auxiliary terminal device;

placing the input in the allocated portion of memory;

forcing the input to both the terminal independent device driver program and the terminal dependent device driver program.

50. A method for effectively paralleling an auxiliary terminal device with a selected terminal device, the auxiliary terminal device and the selected terminal device both connected to a digital computer, the digital computer including a CPU, an operating system, a terminal independent device driver, a plurality of terminal dependent device drivers, and a memory, the method comprising the steps of:

allocating a user controlling device data structure in the memory;

generating a user controlling driver program comprising the steps of:

calling a subroutine to return the address of a unit control block associated with a first terminal dependent device driver which is associated with the selected terminal;

allocating sufficient space in the memory to hold a first port vector table associated with the first terminal dependent device driver;

copying the first port vector table to the allocated portion of memory to create a second port vector table; storing the address of the first port vector table in a unit control block contained in the user controlling device;

changing the second port vector table pointers which point to (a) a start terminal output routine and (b) a start direct memory access output routine to point to their corresponding subroutines contained in the user controlling driver program;

adding the address of the unit control block associated with the first terminal dependent device driver and adding the address of the unit control block contained in the user controlling device to a list of monitored devices;

allocating a second block of memory for use as input and output buffers and to store the address of the input and output buffers in the unit control block contained in the user controlling device;

disabling interrupts from the selected terminal;

changing the pointers contained in the unit control block associated with the first terminal dependent device driver to point to the second port vector table;

copying the address of a get data routine, which retrieves data from the terminal independent device driver and makes that data available to the terminal dependent device driver, from the unit control block assciated with the first terminal dependent device driver to the unit control block contained in the user controlling device;

copying the address of a put data routine, which moves data from the terminal dependent device driver to the terminal independent device driver, from the unit control block associated with the first terminal dependent device driver to the unit control block contained in the user controlling device;

modifying two pointers in the unit control block associated with the first terminal dependent device driver such that the two pointers point to the get data routine and the put data routine associated with the unit control block contained in the user controlling device; and enabling interrupts from the selected terminal.

* * * * *

UNITED STATES PATENT AND TRADEMARK OFFICE
CERTIFICATE OF CORRECTION

PATENT NO. : 4,701,848

DATED : October 20, 1987

INVENTOR(S) : Robert A. Clyde

It is certified that error appears in the above-identified patent and that said Letters Patent is hereby corrected as shown below:

```
Column 1, line 58, "desireable" should be --desirable--
Column 2, line 65, "FIG. 2," should be --FIG. 2 is--
Column 3, line 1, "FIG. 3," should be --FIG. 3 is--
Column 3, line 4, "FIG. 4," should be --FIG. 4 is--
Column 3, line 9, "FIG. 5," should be --FIG. 5 is--
Column 3, line 15, "FIG. 6," should be --FIG. 6 is--
Column 3, line 19, "FIG. 7," should be --FIG. 7 is--
Column 3, line 23, "FIG. 8," should be --FIG. 8 is--
Column 7, line 27, "contans" should be --contains--
Column 7, lines 42-43, "from terminal" should be --from the terminal--
Column 9, line 37, "to holf" should be --to hold--
Column 9, line 62, "VAX/UMS" should be --VAX/VMS--
Column 10, line 10, "occured" should be --occurred--
Column 11, line 2, "UC Driver's routines preserves-- should be
--UC Driver's routines preserve--
Column 11, line 12, "terminal's" should be --terminals--
Column 11, line 24, "terminal's" should be --terminals--
Column 12, line 24, "frm" should be --from--
Column 13, line 10, "distriuition" should be --distribution--
```

UNITED STATES PATENT AND TRADEMARK OFFICE
CERTIFICATE OF CORRECTION

PATENT NO. : 4,701,848
DATED : October 20, 1987
INVENTOR(S) : Robert A. Clyde

It is certified that error appears in the above–identified patent and that said Letters Patent are hereby corrected as shown below:

Column 14, line 28, "rest" should be --reset--
Column 14, line 62, "has just be" should be --has just been--
Column 15, line 8, "call" should be --until--
Column 16, line 8, "ceating a UC Driver" should be --creating a UC Driver--
Column 22, line 25, "portion of memory;" should be --portion of memory; and--
Column 22, line 50, "storing the address of the first port vector table in a unit control block contained in the user controlling device;" should begin a new paragraph Signed and Sealed this Fifth Day of July, 1988

Attest:

DONALD J. QUIGG

Attesting Officer

Commissioner of Patents and Trademarks